June 26, 1951  W. J. B. MARTIN ET AL  2,558,574
WOOD PEELING MACHINE
Filed May 31, 1950  4 Sheets-Sheet 1
Fig. 1
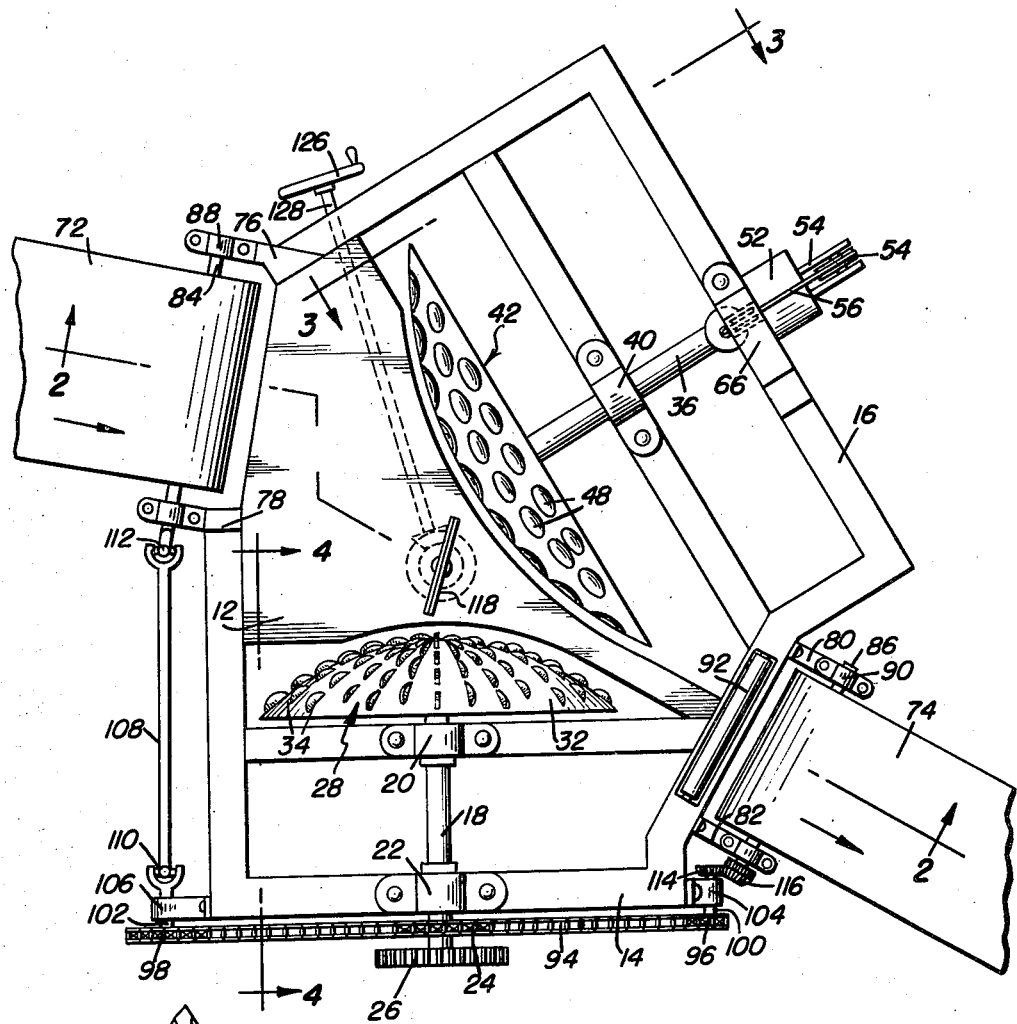
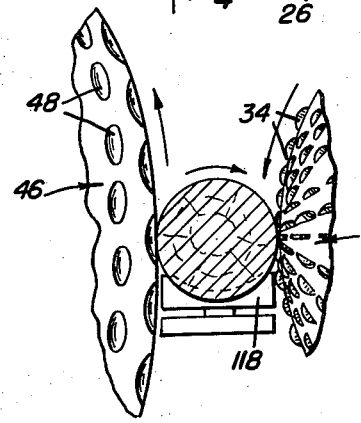
Fig. 8
William J. B. Martin
Ellie L. Owens
Kenneth W. Brown
INVENTORS June 26, 1951    W. J. B. MARTIN ET AL    2,558,574
WOOD PEELING MACHINE Filed May 31, 1950      4 Sheets-Sheet 2

William J.B. Martin
Ellie L. Owens
Kenneth W. Brown
       INVENTORS

BY *Clarence A. O'Brien*
*and Harvey B. Jacobson*
       Attorneys

June 26, 1951  W. J. B. MARTIN ET AL  2,558,574
WOOD PEELING MACHINE

Filed May 31, 1950  4 Sheets-Sheet 3

William J. B. Martin
Ellie L. Owens
Kenneth W. Brown
INVENTORS

BY Clarence A. O'Brien
and Harvey B. Jacobson
Attorneys

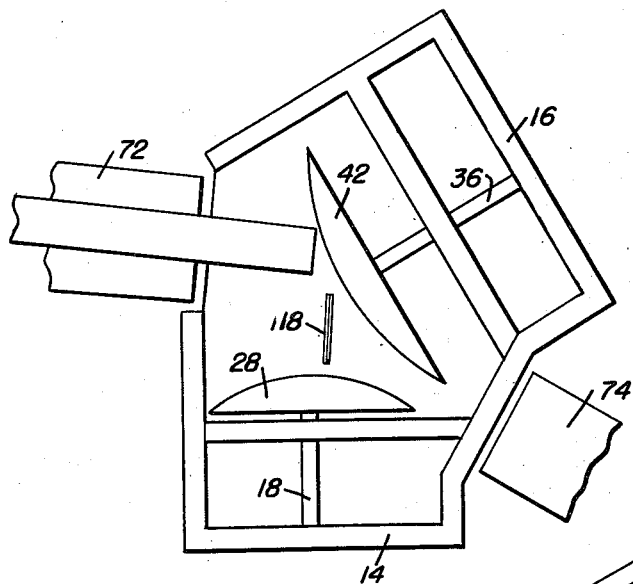
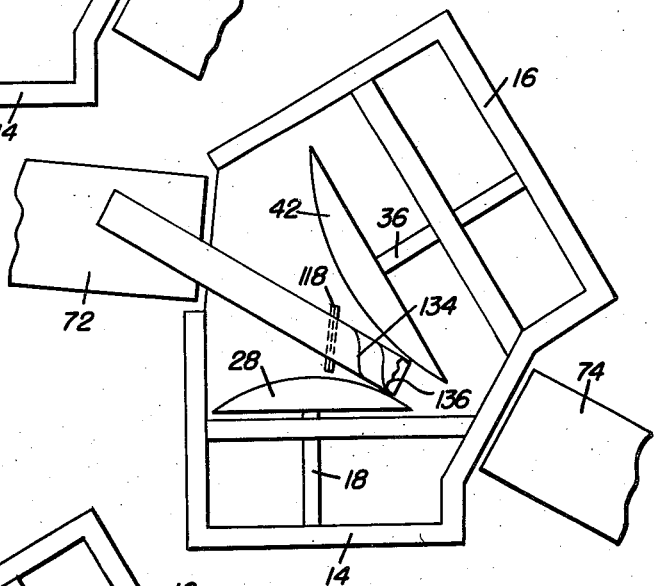
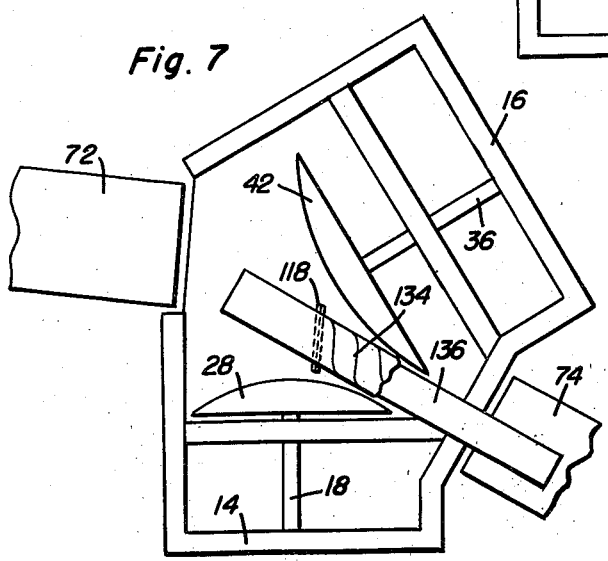

Patented June 26, 1951

2,558,574

UNITED STATES PATENT OFFICE 2,558,574

WOOD PEELING MACHINE

William J. B. Martin and Ellie L. Owen, Beaumont, and Kenneth W. Brown, New Augusta, Miss., assignors of one-fourth to Astor F. Pylant, Purvis, Miss.

Application May 31, 1950, Serial No. 165,288

11 Claims. (Cl. 144—208)

This invention comprises novel and useful improvements in a wood peeling machine and more specifically pertains to an apparatus for automatically and efficaciously removing the bark from logs of various sizes and irregular shapes, with a minimum damage to the peeled log.

The primary object of this invention is to provide an improved power operated apparatus for barking or peeling logs in a more efficient, and satisfactory manner.

An important object of the invention is to provide a log peeling machine which shall enhance the peeling operation upon the log by rotating the latter during the peeling operation.

A still further object of the invention is to provide an improved log barking machine in which a log is passed between cooperating rotary cutting and pressure disks whereby the log is frictionally engaged upon opposite sides of the same and securely held and peeled during passage between the disks.

A still further object of the invention is to provide an improved log barking machine in conformity with the foregoing objects in which the bark of the log is helically cut by a scoring knife during rotation of the log in its passage between the pressure and cutting disks.

Yet another important object of the invention is to provide an improved log barking machine in conformity with the foregoing objects wherein the pressure disk performs the combined functions of yieldingly urging the log against the cutting disk during its passage therebetween; directs the log upon its approach to the disks downwardly upon a scoring knife which supports and helically scores the log during its passage between the disks; and which assists in supporting a log during its passage between the disks for rotation upon its longitudinal axis.

Yet another important object of the invention is to provide an improved log barking apparatus in accordance with the preceding objects having a log delivery conveyor positioned for discharging a log against a rotatable pressure disk and out of alignment with a scoring knife and above the upper edge of the knife.

And a final important feature and object of the invention to be specifically enumerated herein, is to provide a log peeling machine as set forth in the preceding objects in which the inclination of the scoring knife with respect to the axes of rotation of the pressure and cutting disks can be readily adjusted in order to vary the pitch of the helical cut made in the bark of the log by the scoring knife.

These, together with various ancillary features and objects of the invention, which will later become apparent as the following description proceeds, are attained by the present invention, a preferred embodiment which has been illustrated, by way of example, in the accompanying drawings, wherein:

Figure 1 is a top plan view of an improved log peeling machine incorporating therein the principles of this invention, parts of the delivery and discharge conveyors being broken away;

Figure 2 is a vertical longitudinal sectional view taken substantially upon the plane indicated by the broken section line 2—2 of Figure 1, alternative positions of a log being handled by the apparatus being indicated in broken and solid lines therein, the broken line position indicating the manner in which the log, as discharged by the delivery conveyor, engages the pressure wheel, while the solid line position indicates the position of the log as the same has started to pass between the pressure and cutting disks and after the log has been rotated a number of times upon the scoring knife to form a helical groove upon the bark thereon;

Figure 3 is a vertical sectional view taken substantially upon the plane indicated by the section line 3—3 of Figure 1 and illustrating in particular certain structural details and features of the novel pressure disk forming a part of this invention, the figure illustrating in full lines the position of the pressure disk when the same is at its innermost position with respect to the cutting disk and indicating in dotted lines the position of the pressure disk when the same has been yieldingly displaced from the cutting disk as by the passage of a log therebetween;

Figures 5–7 are diagrammatic views taken in top plan and illustrating successive positions of a log as the same passes through the apparatus;

Figure 9:
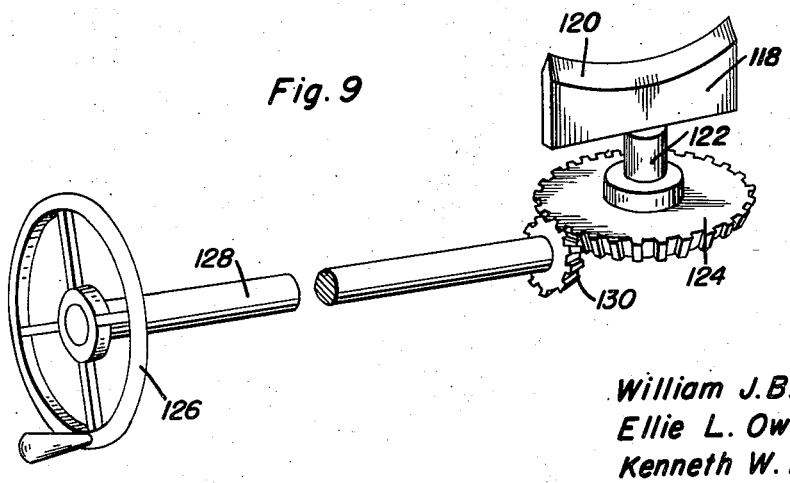

Figure 8 is a vertical sectional detail view showing the manner in which a log is supported by the scoring knife, and by the pressure and cutting disks during the rotation of the log in its passage between the disks; and Figure 9 is a perspective view, parts being broken away, showing in detail the construction of the scoring knife and the means for adjusting the angle between the knife and the longitudinal axis of the log.

In certain wood working and logging operations, it is frequently desired to effectively strip or remove the bark from a log without damaging or impairing the smooth peeled surface of the log. In order to satisfactorily perform this purpose, it is necessary that the apparatus employed shall be capable of handling logs having unsymmetrical contours and shapes, such as crooked or knotty logs of varying and various diameters. Moreover, it is important that in peeling the bark from such logs that the bark shall be cleanly and substantially completely removed without however the removal of the bark effecting a tearing, cutting or abrading of the surface of the peeled log.

The accompanying drawings and the apparatus disclosed hereinafter is specifically intended to yieldingly grip, rotate, and pass a log of the character above mentioned through a pair of complementary cutting and pressure disks and over a scoring knife for this purpose.

Figure 2:
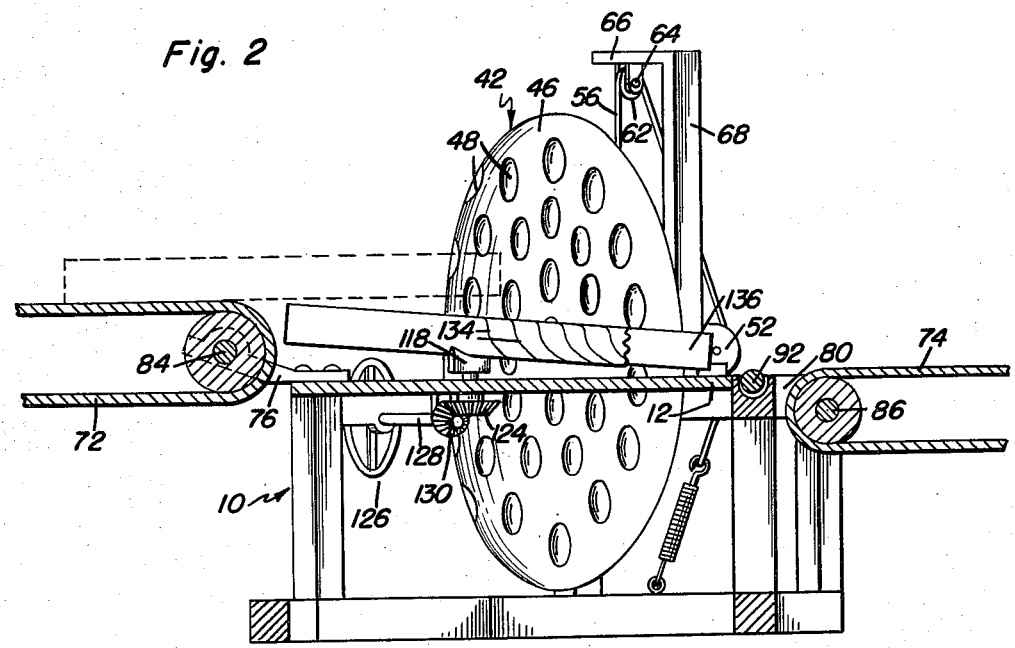
Figure 3:
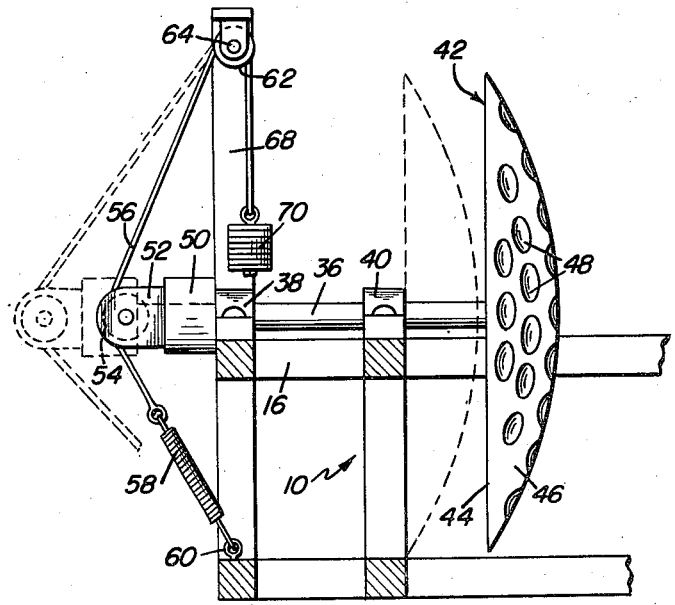
Figure 4:
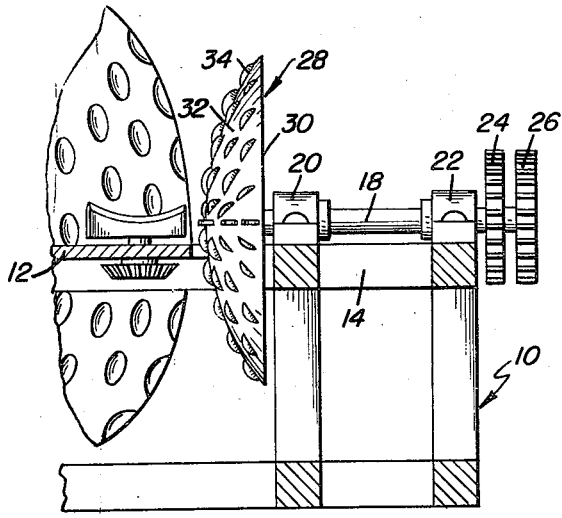
Figure 4 is a vertical transverse sectional view taken substantially upon the plane indicated by the section line 4—4 of Figure 1 and illustrating the relative positions of the cutting disk, the pressure disk and the scoring knife.

Referring now more specifically to the accompanying drawings, wherein like numerals designate similar parts throughout the various views, it will be seen that the invention includes a suitable supporting framework indicated generally by the numeral 10 and shown in Figures 2-4, this framework having a table or top surface 12 and having laterally extending beds or supporting frames 14 and 16 upon which are respectively journaled cutting and pressure disks.

The cutting disk mounting, as shown best in Figure 4, consists of an axle 18 which is mounted or journaled in suitable supporting bearings 20 and 22 whereby the same is removably secured to the top surface of the lateral supporting frame 14, with the axis of rotation of the shaft 18 being disposed substantially in the same horizontal plane as that of the top of the table 12.

Upon its outer end, the shaft 18 is provided with suitable power transmitting means such as a pair of spur gears or sprocket gears 24 and 26.

Upon its inner end, the shaft 18 is provided with a cutter disk indicated generally by the numeral 28, the same preferably comprising a metallic disk having a substantially planar rear surface 30 and a convex or spherical surface 32 which is disposed between the lateral supporting frame 14 and the table 12. As will be apparent from Figure 1, this table may be cut away to provide clearance for the convex face of the cutting disk.

The convex face 32 of the cutting disk is provided with a plurality of cutter elements which obviously may be of various types, these elements as illustrated consisting of projections 34 constituting cutting knives, shredders, abraders or the like of any desired character and shape for effectively ripping, shredding, grating or peeling bark from a log as set forth hereinafter.

As will be more apparent from Figure 3, the pressure disk 2 assembly includes an axle 36 rotatably mounted in suitable journal bearings 38 and 40 secured to the upper surface of the lateral supporting framework 16, the axis of the shaft lying in substantially the same horizontal plane as the axis of the shaft 18, these axes being inclined to each other at any suitable angle such as that shown in Figure 1.

At its inner end, the axle 36 is provided with a pressure disk indicated generally by the numeral 42 this pressure disk having a rear or outer face which is planar as at 44, and having a convex or spherical inner face 46. The convex face 46 is preferably provided with a plurality of appropriately spaced recesses 48 constituting pockets which are adapted to receive and accommodate various irregularities in the surface of a log, as for example knots, crooked portions and the like. As illustrated, the recesses 48 are substantially circular although it will be understood that the same may be of any desired shape or size. It is deemed preferable to form the convex surface 46 of the pressure disk as a smooth surface, although it will be readily understood that this surface may be roughened if desired and further the recesses 48 may be formed in protuberance or projections from the spherical surface 46 and may be provided with relatively sharp edges constituting rims of the recesses.

Upon its outer end, the pressure disk axle 36 has rotatably but non-slidably secured thereto an annular enlargement 50 constituting a shoulder or collar which is adapted to abut against the outer portion of the journal bearing 38, or any suitable surface of the lateral supporting framework 16 in order to constitute a stop which limits the inward movement of the pressure disk. As shown in full lines in Figure 3, the pressure disk assembly is disposed at its innermost position. In the outermost position, shown in dotted lines in Figure 3, it will be apparent that the flat surface 44 of the pressure disk constitutes an abutment surface engaging the inner surface of the journal 40 or an appropriate surface of the lateral supporting frame 16 in order to limit the outward movement of the pressure disk assembly.

In the same manner as set forth in connection with the cutting disk, the table 12 may be cut way in order to accommodate the convex surface of the pressure disk in the innermost position of the same, as shown in Figure 1.

It is to be understood that the pressure disk and cutting disk may be formed of any desired size and shape, but it has been found to be most satisfactory for the purpose of this invention to form the pressure disk of a diameter greater than that of the cutting disk, and preferably of twice the diameter of the same in view of the various functions to be performed by the pressure disk.

Resilient means are provided for yieldably urging the pressure disk towards the cutting disk, yet permitting the pressure disk to recede from the cutting disk during the passage of a log therebetween; and to adjust itself to varying distances from the cutting disk as irregularities in the contour of the log passing between the disks, is encountered. For this purpose, the outer end of the axle 36 and the collar or stub member 50 carried thereby is provided with a block 52 fixed to the collar 50 and in the outer bifurcated end of which is journaled a pulley 54 having a flexible cable 56 passed across its outer portion. The lower end of this cable is preferably attached to a tension spring 58 which in turn is anchored as by an eye bolt 60 to the supporting frame 10, the other end of the cable 56 being entrained over a supporting pulley 62 which is journaled as at 64 carried by a bracket or support 66 at the upper end of a standard 68 attached to the supporting framework 10. The end of this cable is provided with a counterweight of any desired character as at 70 which thus exerts a force of opposition to that of the spring 58.

It will thus be apparent that the force of the weight 70 will tend to urge the cable from the dotted line position shown in Figure 3 to the full line position shown therein, thereby yieldingly urging the pressure disk inwardly or towards the cutting disk. Nevertheless, when a resistance or force is exerted against the pressure disk as by the passage of a log between the disks, the presend of the log will engage the convex surface of the pressure disk 42 above and outwardly of the center of the same. Upon continued travel of the log, it will be apparent that the engagement of the outer end of the same with the pressure disk will cause the pressure disk to rotate, and at the same time the pressure disk will constitute a rotatable guide, which will direct the log laterally from the position shown in Figure 5 to that shown in Figure 6 thereby positioning the log above the scoring knife blade 118. At the same time, the end of the log engaging the pressure disk causes rotation of the same about its axis in a clockwise direction as viewed from the convex end of the pressure disk, and this action will tend to first lift the end of the log as the pressure disk rotates as well as placing this end of the log laterally as above mentioned. However as the rotation continues, the pressure disk will now tend to move the end of the log downwardly as well as laterally thereby moving the log over and above the scoring knife and depressing or deflecting the end of the log outwardly until the same rests upon the scoring knife in the position shown in Figures 2, 6–8. At about the time or shortly after the time the lower surface of the log is pressed downwardly upon the scoring knife, the end of the log will be pressed over into contact with the rotating convex surface of the cutting disk. The log will now be engaged in the position depicted in Figures 8, 2 and 6. At this time, either shortly before or shortly thereafter, the rear end of the log will drop downwardly from the conveyor 72 and the log will now be supported upon the scoring knife, with its forward portion clamped and held between the cutting and pressure disks by the resilient force acting upon the pressure disk.

As soon as the log is firmly engaged and gripped by both the pressure disk and the cutting disk, the log will begin to revolve around its longitudinal axis by virtue of the frictional engagements of these two disks, the directions of rotation being indicated by the arrows in Figure 8. It will now be noted that the cutting elements 34 on the cutting disk will positively produce the direction of the log indicated by the arrow and that the frictional engagement of the pressure disk with the log will cause the pressure disk to now reverse its direction of rotation, thus to some extent supporting the forward end of the log, and drawing the log forwardly through the disk assembly and towards the discharge conveyor 74.

During this forward travel and rotation of the log it will now be seen that the cutting elements 34 will peel, shred, grate or cut the bark from the log to an extent and depth dependent upon the dimensions of the cutting elements. In addition, the rotation of the log upon the knife edge 120 of the scoring knife 118, will by virtue of the angle of this knife edge with respect to the longitudinal axis of the log, cause the knife edge to form a spiral cut, slice or groove in the bark of the log as indicated by the numeral 134. It will be apparent that the beginning or initiation of this spiral groove will be rearwardly from that portion of the log which is peeled by the cutting elements 34, the peeled portion of the log being indicated by the numeral 136.

It will thus be apparent that the scoring knife performs several important functions in the operation of this apparatus. It not only serves to support and elevate the rear end of the log during its travel between the disks, but also serves as a brake or retarding means which limits the travel to a rate which is proportional to the speed of rotation and to the angle between the blade 118 and the longitudinal axis of the log; and finally it scores the bark into a strip and thus facilitates the action of the cutting elements 34 in peeling the bark off the log and reduces the opportunity for removing portions of the bark adhering to the underlying wood and leaving rips or depressions in the cleaned log.

It will be apparent that the pitch of the helical grooves and also the speed of travel of the logs through the machine may be adjusted or regulated by rotating the scoring knife about its vertical supporting shaft 122 in the manner previously mentioned.

Prior to the time the rear end of the log emerges from between the two disks, the front end of the log will pass over the roller 92 and upon the upper flight of the discharge conveyor 74, whereby the latter will assist in completion of the passage of the log between the disks.

The offsetting of the scoring knife from the longitudinal axis of the delivery conveyor 72 prevents the log when delivered by this conveyor from abutting directly against the scoring knife and possibly damaging the same, the log being manipulated by the pressure disk and placed upon the scoring knife as set forth hereinbefore.

It should be hereunderstood that various features of the invention may be omitted as desired. For example, the device will perform useful results even if the scoring knife is omitted. Moreover, it is evident that the principles of this invention are not to be limited to the exact construction of the various elements shown, inasmuch as various types of conveyors, various driving means for the same and various constructions of cutting and pressure disks could be employed.

From the foregoing, the construction and operation of the device will be readily understood and further explanation is believed to be unnecessary. However, since numerous modifications and changes will readily occur to those skilled in the art after a consideration of the foregoing specification and accompanying drawings, it is not desired to limit the invention to the exact construction shown and described, but all suitable modifications and equivalents may be resorted to, falling within the scope of the appended claims.

Having described the invention, what is claimed as new is:

1. A log peeling machine including a cutting disk and a pressure disk, said disks being journaled for rotation about axes which are inclined to each other and lie in the same plane, said cutter disk having cutters on the face thereof, said pressure disk having a smooth face with recesses therein, said disks having convex faces, said pressure disk being of greater diameter than that of the cutter disk.

2. A log peeling machine including a frame supporting a cutting disk and a pressure disk, said disks, being journaled for rotation about axes which are inclined to each other and lie in the same plane, and a scoring knife blade mounted on said frame and disposed between said disks, a plane containing said scoring knife blade and the plane containing said axes being vertically and horizontally disposed, respectively.

3. A long peeling machine including a frame supporting a cutting disk and a pressure disk, said disks being journaled for rotation about axes which are inclined to each other and lie in the sure disk assembly will be slid to the left as shown in Figure 3, thereby flexing the cable from the full line to the dotted line position, against the tension of the spring 58 and of the weight 70.

It will of course be readily understood that in some instances the spring 58 may be omitted, the lower end of the cable 56 being directly secured to the eye bolt 60.

As shown more clearly in Figure 1, the supporting frame 10 serves to support the ends of a pair of log conveyors, the conveyor indicated at 72 constituting a log delivery conveyor, while that indicated at 74 constitutes a log discharge conveyor. For this purpose, the supporting framework is provided with mounting brackets 76, 78 for the conveyor 72 and 80 and 82 for the conveyor 74.

These conveyors may be of any desired type and character, and merely for the purpose of illustrating the manner in which the conveyors cooperate with the actual bark peeling portion of the apparatus, the conveyors are shown as of the belt type having end axles 84 and 86 which are journaled in suitable journal bearings 88 and 90 carried by the above mentioned brackets 76, 78 and 80, 82. As shown clearly in Figure 2, the upper flight or log carrying surface of the delivery conveyor 72 is disposed in a horizontal plane above the table 12, while the corresponding surface of the discharge conveyor 74 is disposed substantially in the same horizontal plane as the table. In addition, the supporting framework has an idler roller 92 recessed or journaled therein between the adjacent ends of the table 12 and of the discharge conveyor 74, the upper surface of this roller protruding slightly upwardly from the surface of the table in order to facilitate passage of a log from the table to the discharge conveyor.

It will be understood that the principles of this invention are not to be limited to any particular means for driving the conveyors, although it has been found preferable in some instances to employ a common means for operating the cutting disk, the delivery conveyor and the discharge conveyor. Such an arrangement is clearly shown in Figure 1, wherein the previously mentioned gear 26 constitutes a means whereby any suitable source of power may be applied to the axle 18 of the cutting disk assembly, for operating the latter. The sprocket wheel 24 is adapted to drivingly connect a sprocket chain 94 which is entrained over a pair of sprockets 96 and 98 carried by stub axles 100 and 102 which are journaled in suitable support brackets 104 and 106 mounted upon the side of the lateral supporting frame 14.

These stub axles may be drivingly connected in any desired manner to the conveyors 72 and 74 for operating the same; and a convenient mechanism as illustrated in Figure 1 consists of a driving shaft 108 which is connected as by universal joints 110 and 112 to the stub axle 102 and the axle 84 of the conveyor 72 for drivingly connecting the same, despite variations in the angular relation of the shafts.

The stub axle 100 is preferably provided with a bevel gear 114 which continuously meshes with a similar bevel gear 116 carried by the end of the shaft 86 of the conveyor 74.

It will thus be apparent that the common source of power which is applied to the gear 26 will simultaneously directly operate the cutting disk 28; and through the sprocket chain assembly will operate the two conveyors.

As so far described, it will now be apparent that the cutting disk is positively rotated by a power source, while the pressure disk is freely rotatable without the direct application of power thereto.

Attention is now directed to Figures 1, 2, 5–7. The discharge conveyor 74 may be disposed at any desired angle with respect to the passage between the cutting and pressure disks. However it is preferred to position the delivery conveyor 72 in such a manner that its longitudinal axis will be disposed for intersection of or impingement upon the surface of the pressure disk at a place which is displaced from the center of rotation of the pressure disk both vertically above the same and horizontally from the same on that side of the disk assembly which is adjacent the delivery conveyor.

Although it is not necessary, it is preferred to employ a conveyor 72 of such a character that the logs delivered by the conveyor, regardless of their size will be transported substantially upon the longitudinal medial axis of the conveyor, as for example by employing a trough shaped belt type of conveyor. The purpose of the particular conveyor disposition will be set forth hereinafter.

It will be further seen that there is rotatably journaled upon, supported by and vertically extending above the table 12, an adjustable scoring knife. This scoring knife, as shown best in Figure 9, consists of a flat plate-like blade 118 which is disposed substantially in a vertical plane, this blade having a sharpened or beveled upper edge 120 which is of a concave or arcuate shape. The blade 118 is carried by a cylindrical standard 122, which is suitably journaled in and supported by the table 12, the standard having a depending actuating member in the form of a beveled spur gear 124 disposed beneath the table. By means of a control wheel 126 and a control shaft 128 provided with a bevel gear 130 meshing with the above mentioned gear 124, it will be evident that the operator from a convenient location beside the supporting framework of the device may horizontally rotate or adjust the scoring knife about the vertical axis of rotation of the standard 122. As will be best apparent from Figure 2, the upper edge 120 of the scoring knife is spaced vertically above the table 12, but disposed vertically below the horizontal plane of the top surface of the delivery conveyor 72, while as shown in Figure 1 the knife is positioned between the cutting and pressure disks and in the passageway therebetween. Moreover, the knife is offset from the above mentioned longitudinal axis of the conveyor 72 so that a log conveyed by this conveyor will move in a path which does not intersect any portion of the scoring knife.

From the foregoing it is felt that the operation of the device may now be understood. When the source of power is energized, the cutting disk 28, the delivery conveyor 72 and the discharge conveyor 74 will be rotating, while the freely rotatable pressure disk 42 will remain idle. It may be assumed that the scoring knife is disposed at the angle shown in Figure 1 with respect to the axes of rotation of the cutting and pressure disks. The proportions of the parts will be such and their spacing will be such that a log carried by the conveyor 72 will be positioned substantially upon the longitudinal medial plane of the same and after one end passes the discharge end of this conveyor, it will overhang the end of the conveyor in cantilever fashion until the positions of Figures 2 and 5 is obtained, at which time the same plane, and a scoring knife blade mounted on said frame and disposed between said disks, a plane containing said scoring knife blade and the plane containing said axes being vertically and horizontally disposed, respectively, and the upper edge of said knife having a concave cutting surface for receiving a log during its passage between said disks.

4. A log peeling machine including a frame supporting a cutting disk and a pressure disk, said disks being journaled for rotation about axes which are inclined to each other and lie in the same plane, and a delivery conveyor positioned adjacent said frame and transporting logs to said disks for passage therebetween, the longitudinal axis of said conveyor intersecting a face of said pressure disk eccentrically of its rotational axis.

5. A log peeling machine including a frame supporting a cutting disk and a pressure disk, said disks being journaled for rotation about axes which are inclined to each other and lie in the same plane, a scoring knife mounted on said frame and disposed between said disks, and a delivery conveyor positioned adjacent said frame and transporting logs for passage between said disks and across said scoring knife.

6. A log peeling machine including a frame supporting a cutting disk and a pressure disk, said disks being journaled for rotation about axes which are inclined to each other and lie in the same plane, a scoring knife mounted on said frame and disposed between said disks, and a delivery conveyor positioned adjacent said frame and transporting logs for passage between said disks and across said scoring knife, said conveyor having a log discharge end disposed in a plane above said knife.

7. A log peeling machine including a frame supporting a cutting disk and a pressure disk, said disks being journaled for rotation about axes which are inclined to each other and lie in the same plane, a scoring knife mounted on said frame and disposed between said disks, and a delivery conveyor positioned adjacent said frame and transporting logs for passage between said disks and across said scoring knife, said conveyor having a log discharge end disposed in a plane above said knife, the longitudinal axis of said conveyor intersecting a face of said pressure disk eccentrically of its rotational axis, and said scoring knife being offset from said longitudinal axis.

8. A log peeling machine including a frame supporting a cutting disk and a pressure disk, said disks being journaled for rotation about axes which are inclined to each other and lie in the same plane, a table and a scoring knife mounted on said frame and disposed between said disks, the plane of said disk axes being parallel and adjacent to a plane containing the top surface of said table, and said knife having its scoring edge disposed above said table for supporting a log in spaced relation to said table.

9. A log peeling machine including a frame supporting a cutting disk and a pressure disk, said disks being journaled for rotation about axes which are inclined to each other and lie in the same plane, a table and a scoring knife mounted on said frame and disposed between said disks, the plane of said disk axes being parallel and adjacent to a plane containing the top surface of said table, said knife having its scoring edge disposed above said table for supporting a log in spaced relation to said table, a delivery conveyor positioned adjacent said frame and transporting logs for passage between said disks and across said scoring knife, said conveyor having a log discharge end disposed in a plane above said knife, the longitudinal axis of said conveyor intersecting a face of said pressure disk eccentrically of its rotational axis, and said scoring knife being offset from said longitudinal axis.

10. A log peeling machine including a frame supporting a cutting disk and a pressure disk, said disks being journaled for rotation about axes which are inclined to each other and lie in the same plane, a table and a scoring knife mounted on said frame and disposed between said disks, the plane of said disk axes being parallel and adjacent to a plane containing the top surface of said table, said knife having its scoring edge disposed above said table for supporting a log in spaced relation to said table, a delivery conveyor positioned adjacent said frame and transporting logs for passage between said disks and across said scoring knife, said conveyor having a log discharge end disposed in a plane above said knife, the longitudinal axis of said conveyor intersecting a face of said pressure disk eccentrically of its rotational axis, said scoring knife being offset from said longitudinal axis, and a discharge conveyor positioned adjacent said frame and removing logs that have passed between said disks, said discharge conveyor having a receiving end disposed in the plane containing the top of said table.

11. A log peeling machine including a frame supporting a cutting disk and a pressure disk, said disks being journaled for rotation about axes which are inclined to each other and lie in the same plane, a table and a scoring knife mounted on said frame and disposed between said disks, the plane of said disk axes being parallel and adjacent to a plane containing the top surface of said table, said knife having its scoring edge disposed above said table for supporting a log in spaced relation to said table, a delivery conveyor positioned adjacent said frame and transporting logs for passage between said disks and across said scoring knife, said conveyor having a log discharge end disposed in a plane above said knife, the longitudinal axis of said conveyor intersecting a face of said pressure disk eccentrically of its rotational axis, said scoring knife being offset from said longitudinal axis, a discharge conveyor positioned adjacent said frame and removing logs that have passed between said disks, said discharge conveyor having a receiving end disposed in the plane containing the top of said table, and common means for operating said cutting disk and both of said conveyors.

WILLIAM J. B. MARTIN.
ELLIE L. OWEN.
KENNETH W. BROWN.

REFERENCES CITED

The following references are of record in the file of this patent:

UNITED STATES PATENTS

| Number | Name | Date |
|---|---|---|
| 632,979 | Wolfe | Sept. 12, 1899 |
| 1,017,655 | Drake | Feb. 20, 1912 |
| 2,055,108 | Hokonson | Sept. 22, 1936 |
| 2,083,462 | Long et al. | June 8, 1937 |